(12) United States Patent
Bachhuber et al.

(10) Patent No.: US 9,365,156 B2
(45) Date of Patent: Jun. 14, 2016

(54) LIGHTING APPARATUS AND VEHICLE

(71) Applicant: DIEHL AEROSPACE GmbH, Ueberlingen (DE)

(72) Inventors: Martin Bachhuber, Altdorf (DE); Frank Schmid, Poppenricht (DE)

(73) Assignee: DIEHL AEROSPACE GMBH, Ueberlingen (DE)

( * ) Notice: Subject to any disclaimer, the term of this patent is extended or adjusted under 35 U.S.C. 154(b) by 183 days.

(21) Appl. No.: 14/450,429

(22) Filed: Aug. 4, 2014

(65) Prior Publication Data

US 2015/0043230 A1 Feb. 12, 2015

(30) Foreign Application Priority Data

Aug. 6, 2013 (DE) .......................... 10 2013 013 106

(51) Int. Cl.
| | |
|---|---|
| *B60Q 3/02* | (2006.01) |
| *B60Q 3/00* | (2006.01) |
| *B64D 11/00* | (2006.01) |
| *F21W 101/02* | (2006.01) |

(Continued)

(52) U.S. Cl.
CPC .............. *B60Q 3/0253* (2013.01); *B60Q 3/001* (2013.01); *B60Q 3/0203* (2013.01); *B60Q 3/0256* (2013.01); *B60Q 3/0259* (2013.01); *B64D 11/00* (2013.01); *B64D 2011/0038* (2013.01); *B64D 2011/0053* (2013.01); *F21W 2101/02* (2013.01); *F21W 2101/04* (2013.01); *F21W 2101/06* (2013.01); *F21W 2101/08* (2013.01)

(58) Field of Classification Search
CPC .... B60Q 3/0253; B60Q 3/001; B60Q 3/0203; B60Q 3/0256; B60Q 3/0259; B64D 11/00; B64D 2011/0038; B64D 2011/0053; F21W 2101/02; F21W 2101/04; F21W 2101/06; F21W 2101/08
USPC ......... 362/471, 488, 490, 523, 528, 529, 530, 362/545
See application file for complete search history.

(56) References Cited

U.S. PATENT DOCUMENTS 6,367,956 B1 *  4/2002  Becker ................ B60Q 3/0286
                                                        362/293
7,434,962 B2 * 10/2008  Stache ................ B60Q 3/0253
                                                        362/274

(Continued)

FOREIGN PATENT DOCUMENTS

| DE | 199 26 782 A1 | 12/2000 |
| DE | 199 43 984 A1 | 4/2001 |

(Continued)

*Primary Examiner* — Laura Tso
(74) *Attorney, Agent, or Firm* — Scully, Scott, Murphy & Presser, P.C.

(57) ABSTRACT

A lighting apparatus, in particular a reading lamp, is provided. The apparatus can be recessed in a trim of a passenger cab of a vehicle, which can be a land vehicle, an aircraft, or a watercraft. The apparatus has a first light-emitting device that is pivotably mounted to a recess-mounting frame, so that a light-emitting direction of the first light-emitting device with respect to the recess-mounting frame is changeable. To simplify the design of the apparatus, a second light-emitting device is mounted to a visible side of the recess-mounting frame. The second light-emitting device at least partially surrounds the first light-emitting device and is fitted to the recess-mounting frame, so that the light-emitting direction of the second light-emitting device is invariable.

12 Claims, 1 Drawing Sheet

(51) Int. Cl.
    *F21W 101/04*    (2006.01)
    *F21W 101/06*    (2006.01)
    *F21W 101/08*    (2006.01)

(56) References Cited

U.S. PATENT DOCUMENTS

2005/0105297 A1\* 5/2005 Suzuki ............... B60Q 3/0286
                                                         362/490
2006/0056194 A1\* 3/2006 Lin ..................... B60Q 1/0052
                                                         362/545
2006/0215414 A1\* 9/2006 Lauber ................. B60Q 3/002
                                                         362/511
2012/0230530 A1    9/2012  Schevardo

FOREIGN PATENT DOCUMENTS

| DE | 102008051251 A1 | 4/2010 |
| DE | 102011013368 A1 | 9/2012 |
| EP | 2 439 105 A2 | 4/2012 |

\* cited by examiner

LIGHTING APPARATUS AND VEHICLE

BACKGROUND OF THE INVENTION

The invention relates to a lighting apparatus. In addition, the invention relates to a vehicle comprising such a lighting apparatus.

DISCUSSION OF THE PRIOR ART

EP 2 439 105 A2 discloses a lighting apparatus, in particular a reading lamp, for recessing in a roof trim of a passenger cab of an aircraft. In this case, a first light-emitting device is held pivotably in a recess-mounting frame so that a light-emitting direction of the first light-emitting device with respect to the recess-mounting frame is changeable. That is to say that the passenger can adjust the light-emitting direction of the light generated by the first light-emitting device according to his requirements.

In accordance with the prior art, vehicles for conveying passengers, in particular land vehicles, aircraft or watercraft, need to be equipped with emergency lighting which is switched on automatically in the event of failure of a cab current supply system and is supplied electrical energy by an emergency current supply system which can be operated independently of the cab current supply system. Light-emitting devices for emergency lighting need to be fitted in the passenger cab in such a way that they are easily identifiable from all sides. Emergency lighting in accordance with the prior art generally comprises a plurality of separate light-emitting devices which are recessed into the trim of the passenger cab. A conventional lighting device for lighting a passenger cab of a vehicle is therefore elaborate.

SUMMARY OF THE INVENTION

The object of the invention consists in eliminating the disadvantages in accordance with the prior art. In particular, the intention is to specify a simple and inexpensive lighting apparatus for lighting a passenger cab of a vehicle.

The invention proposes that the recess-mounting frame has, on its visible side, a second light-emitting device which at least sectionally surrounds the first light-emitting device and which is fitted invariably in respect of its light-emitting direction on the recess-mounting frame.

The first light-emitting device, in particular in the configuration as a reading lamp, is fitted in a relatively exposed position in the region of the roof trim of a passenger cab. The present invention makes use of this circumstance. It is proposed to attach a second light-emitting device, which at least partially surrounds the first light-emitting device, to the recess-mounting frame of the first light-emitting device. As a result, the second light-emitting device also has a relatively exposed position which is easily identifiable from all sides in the passenger cab, corresponding to specifications for emergency lighting. By virtue of the first light-emitting device, which is preferably used as a reading lamp in its pivotable configuration, being combined with a second light-emitting device on the recess-mounting frame of said first light-emitting device, only one aperture needs to be produced in the trim in order to fit both light-emitting devices. First cables for supplying current to the first light-emitting device can be combined in one line with second cables for supplying current to the second light-emitting device. This further facilitates installation of the lighting apparatus according to the invention. Apart from this, in the proposed combination the second light-emitting device can be configured in such a way that it is easily identifiable as emergency lighting for the passenger. Such a passenger will therefore advantageously not be reminded of a potential emergency situation during transport in the passenger cab. Finally, the lighting apparatus according to the invention can be produced relatively easily. Only the recess-mounting frame needs to be changed. Moreover, in particular in respect of the first light-emitting device, conventionally available components can be used.

In accordance with an advantageous configuration of the invention, the second light-emitting device is in the form of a ring and surrounds the first light-emitting device. The second light-emitting device can in particular be dome-shaped and be raised from the recess-mounting frame. It advantageously surrounds, in a form-fitting manner, an at least sectionally spherical housing of the first light-emitting device in such a way that the first light-emitting device, similarly to an air jet, is pivotable with respect to the dome-shaped ring.

In accordance with a further advantageous configuration, the first light-emitting device comprises at least one first LED and a controller, with which a brightness and/or a colour of a light generated by the first LED is optionally adjustable. A suitable controller for adjusting the brightness and/or colour of the light generated by the first LED is generally known in accordance with the prior art.

In accordance with a further advantageous configuration, the second light-emitting device has, for light output, at least one transparent light output means with a light output surface and a light input surface. The transparent light output means can be produced from a transparent plastic. The light output surface can have a roughened or matt configuration. The light input surface may be, for example, an edge of a light output means in the form of a ring segment or ring. The light input surface is advantageously provided on a recess side which is opposite the visible side of the recess-mounting frame, so that the light input via the light input surface is visible to the passenger only on the light output surface.

In order to input light into the light input surface, at least one second LED, which is different from the first LED, is provided. The second LED can have a simple configuration. If the second light-emitting device is used exclusively for emergency lighting, a controller for a brightness and/or colour of the second LED is not required. Said LED merely needs to be supplied current.

From a design point of view, it is advantageous that the second LED is coupled to the light input surface by means of at least one fibreoptic conductor for light input. It is also possible for a plurality of fibreoptic conductors with the second LED to be provided for distributing the light generated by said second LED onto the light input surface. In addition, it is possible to provide a plurality of second LEDs, which are each coupled to the light input surface by at least one fibreoptic conductor for inputting light.

The light output means is advantageously in the form of a ring or at least one ring segment. It preferably has a dome-shaped configuration, i.e. the light output surface and/or an opposite rear surface are spherical. The radius of the rear surface can be matched to a radius of a spherical housing of the first light-emitting device in such a way that the first light-emitting device is surrounded substantially in a form-fitting manner by the light output means.

Finally, the invention proposes a vehicle, in particular a land vehicle, aircraft or watercraft, in which at least one lighting apparatus according to the invention is recessed into a trim of a passenger cab, wherein the first light-emitting apparatus, for the supply of current, is connected to a cab current supply system and the second light-emitting apparatus, for the supply of current, is connected to an emergency current supply system, which can be operated independently of the cab current supply system. In addition, a lighting controller can be provided, with which the emergency current supply system is activated automatically, and therefore the second light-emitting device is switched on, in the event of failure of the cab current supply system.

BRIEF DESCRIPTION OF THE DRAWINGS

Exemplary embodiments of the invention will be explained in more detail below with reference to the drawings, in which.

DETAILED DESCRIPTION OF THE INVENTION

Figure 1:
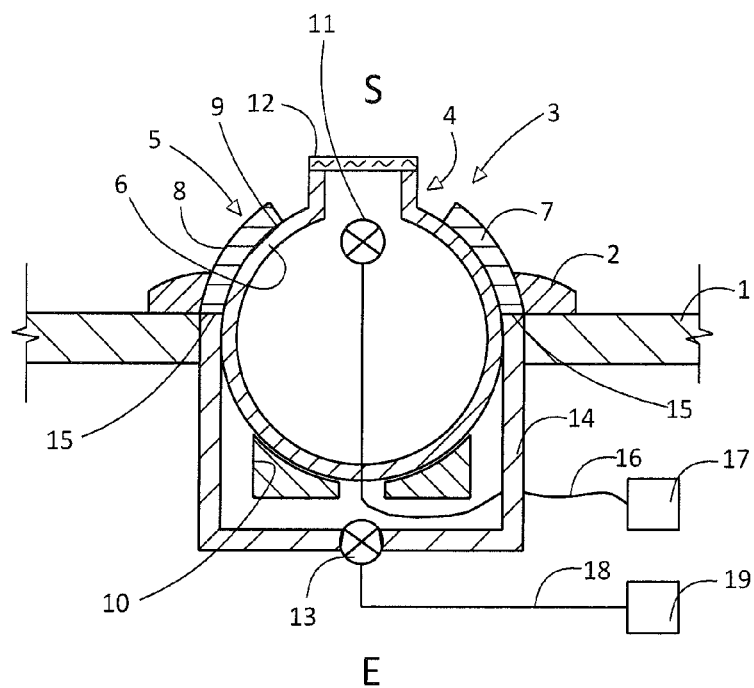
FIG. 1 shows a schematic cross-sectional view of a first lighting apparatus.
Figure 2:
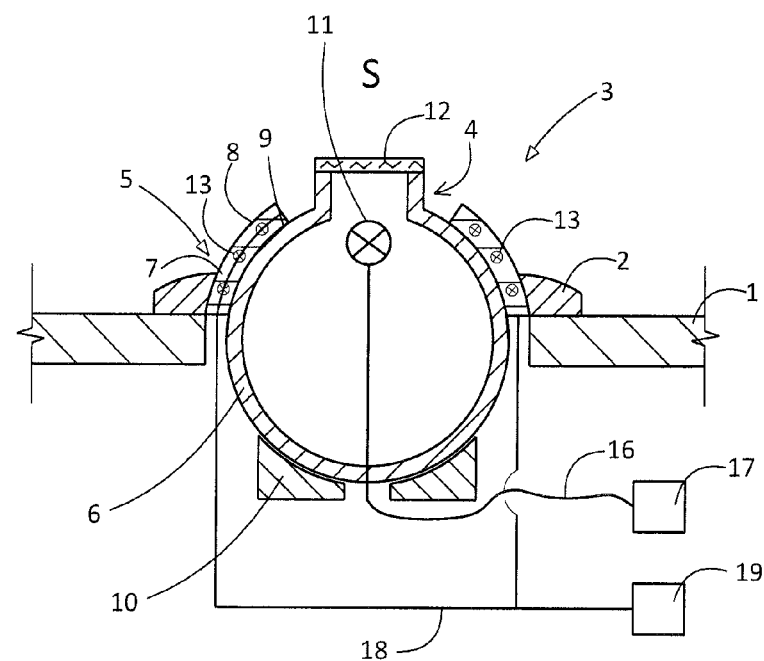
FIG. 2 shows a schematic cross-sectional view of a second lighting apparatus.

In the lighting apparatuses shown in FIGS. 1 and 2, a trim panel for the trim of a passenger cab (not illustrated in any more detail here), for example of a passenger aircraft, is denoted by the reference symbol 1. Such a trim panel 1 can be formed from a sandwich structure, in which a supporting structure is laminated between a top layer and a bottom layer. The supporting structure can be in particular a honeycomb structure, which is reinforced with aramid fibres.

A recess-mounting frame which is part of a lighting apparatus, denoted generally by the reference symbol 3, is denoted by the reference symbol 2. The lighting apparatus 3 comprises a first light-emitting device 4, which is held pivotably in the recess-mounting frame 2. For this purpose, the first light-emitting device 4 can have an at least sectionally spherical housing 6. A second light-emitting device which comprises a ring-like light output means 7 is denoted by the reference symbol 5. The light output means 7 is in this case formed as a type of dome. It surrounds the housing 6 sectionally. The housing 6 rests in a form-fitting manner on the light output means 7. The light output means 7 can be produced, for example, from a transparent plastic. It extends from a visible side S of the recess-mounting frame 2 towards the outside. A light output surface 8 of the light output means 7 is curved spherically, for example. A rear surface 9 opposite the light output surface 8 is likewise curved spherically with a radius which corresponds to an outer radius of the housing 6. The housing 6 is furthermore supported by correspondingly shaped supporting means 10, which are arranged substantially opposite the light output means 7 and are fixedly connected to the recess-mounting frame 2 (not illustrated here).

A first LED is denoted by the reference symbol 11. Light generated thereby can be emitted through a disk 12 closing off the housing 6. A second LED which is arranged on a recess side E opposite the visible side S is denoted by the reference symbol 13. The second LED 13 is optically conductively connected to a light input surface 15 of the light output means 7 via fibreoptic conductors 14.

The lighting apparatus 3 is preferably designed in the manner of a module or an installation unit.

A first current supply line 16 connects the first LED 11 to a cab current supply system 17, indicated schematically here. A second current supply line 18 connects the second LED 13 to an emergency current supply system 19, indicated here schematically. The emergency current supply system 19 is independent of the cab current supply system 17. In the event of failure of the cab current supply system 17, the emergency current supply system 19 automatically supplies current to the second LED 13.

In the second lighting apparatus 3 shown in FIG. 2, a plurality of second LEDs 13 is provided, which are part of the light output means 7.

The operation of the lighting apparatus 3 shown in the figures is as follows:

During normal operation, the first LED 11 or else a plurality of first LEDs 11 (not shown here) is supplied current via the cab current supply system 17. The first light-emitting device 4 is held in articulated fashion in the recess-mounting frame 2, so that a light generated by the at least first LED 11 can be directed onto a specific point by adjustment of the first light-emitting device 4 by the passenger. In the event of failure of the cab current supply system 17, for example in the event of an accident or the like, the emergency current supply system 19 is activated, as a result of which the at least one second LED 13 generates light which is output via the light output surface 8 of the light output means 7 and therefore provides emergency lighting.

Although the light output means 7 is illustrated as a dome-shaped ring in the figures, the light output means 7 can also have a different configuration within the scope of the present invention. For example, the light output means 7 can comprise a plurality of dome-shaped ring segments. The light output surface 8 can also have a configuration in the form of a pyramid, a stepped configuration or a rectangular configuration in cross section.

The light output surface 8 is advantageously matt or roughened so as to avoid reflections. The light input surface 15, on the other hand, has a smooth surface in order to minimize losses during light coupling by means of the fibreoptic conductor 14.

The recess-mounting frame 2 can also, as a whole, be configured as light output means 7. In this case, the light output means 7 also needs to be configured as holding means for pivotably holding the first light-emitting device 3.

Although this is not shown in the figures, the first light-emitting device 4 does not necessarily need to have a spherical housing 6. The first light-emitting device 4 can also be held pivotably in the recess-mounting frame 2 in another way. For example, reference is made to EP 2 439 105 A2, which to this extent discloses an alternative configuration for pivotable holding of the first light-emitting device 4.

LIST OF REFERENCE SYMBOLS

1 Trim panel
2 Recess-mounting frame
3 Lighting apparatus
4 First light-emitting device
5 Second light-emitting device
6 Housing
7 Light output means
8 Light output surface
9 Rear surface
10 Supporting means
11 First LED
12 Disk
13 Second LED
14 Fibreoptic conductor
15 Light input surface
16 First current supply line
17 Cab current supply system
18 Second current supply line
19 Emergency current supply system
E Recess side
S Visible side

What is claimed is:

1. A lighting apparatus mountable in a trim of a passenger cab of a vehicle, the lighting apparatus comprising:
   a first light-emitting device pivotably mounted to a recess-mounting frame so that a light-emitting direction of the first light-emitting device with respect to the recess-mounting frame is changeable, wherein the recess-mounting frame comprises a visible side, and
   a second light-emitting device, wherein the second light-emitting device at least partially surrounds the first light-emitting device and is fitted to the recess-mounting frame so that the light-emitting direction of the second light-emitting device is invariable.

2. The lighting apparatus according to claim 1, wherein the second light-emitting device comprises a ring and surrounds the first light-emitting device.

3. The lighting apparatus according to claim 1, wherein the first light-emitting device comprises at least one first LED and a controller for selectively controlling at least one of a brightness and a color of the light generated by the first LED.

4. The lighting apparatus according to claim 1, wherein the second light-emitting device comprises at least one transparent light output means having a light output surface and a light input surface.

5. The lighting apparatus as claimed in claim 4, further comprising at least one second LED, which is different the first LED, for inputting light into the light input surface.

6. The lighting apparatus as claimed in claim 5, wherein the second LED is coupled to the light input surface by means of at least one fibreoptic conductor for light input.

7. The lighting apparatus as claimed in claim 4, wherein the light output means comprises a ring or at least one ring segment.

8. The lighting apparatus as claimed in claim 4, wherein at least one of the light output surface and an opposite rear surface is spherical.

9. The lighting apparatus according to claim 1, wherein said lighting apparatus comprises a reading lamp.

10. The lighting apparatus according to claim 1, wherein said vehicle is a land vehicle, an aircraft or a watercraft.

11. A vehicle comprising at least one lighting apparatus according to claim 1, wherein the at least one lighting apparatus is recessed into a trim of a passenger cab of the vehicle,
   wherein the first light-emitting apparatus, for the supply of current, is connected to a cab current supply system and the second light-emitting apparatus, for the supply of current, is connected to an emergency current supply system, which can be operated independently of the cab current supply system.

12. The vehicle according to claim 1, wherein said vehicle is a land vehicle, an aircraft or a watercraft.

* * * * *